Patented Sept. 20, 1949

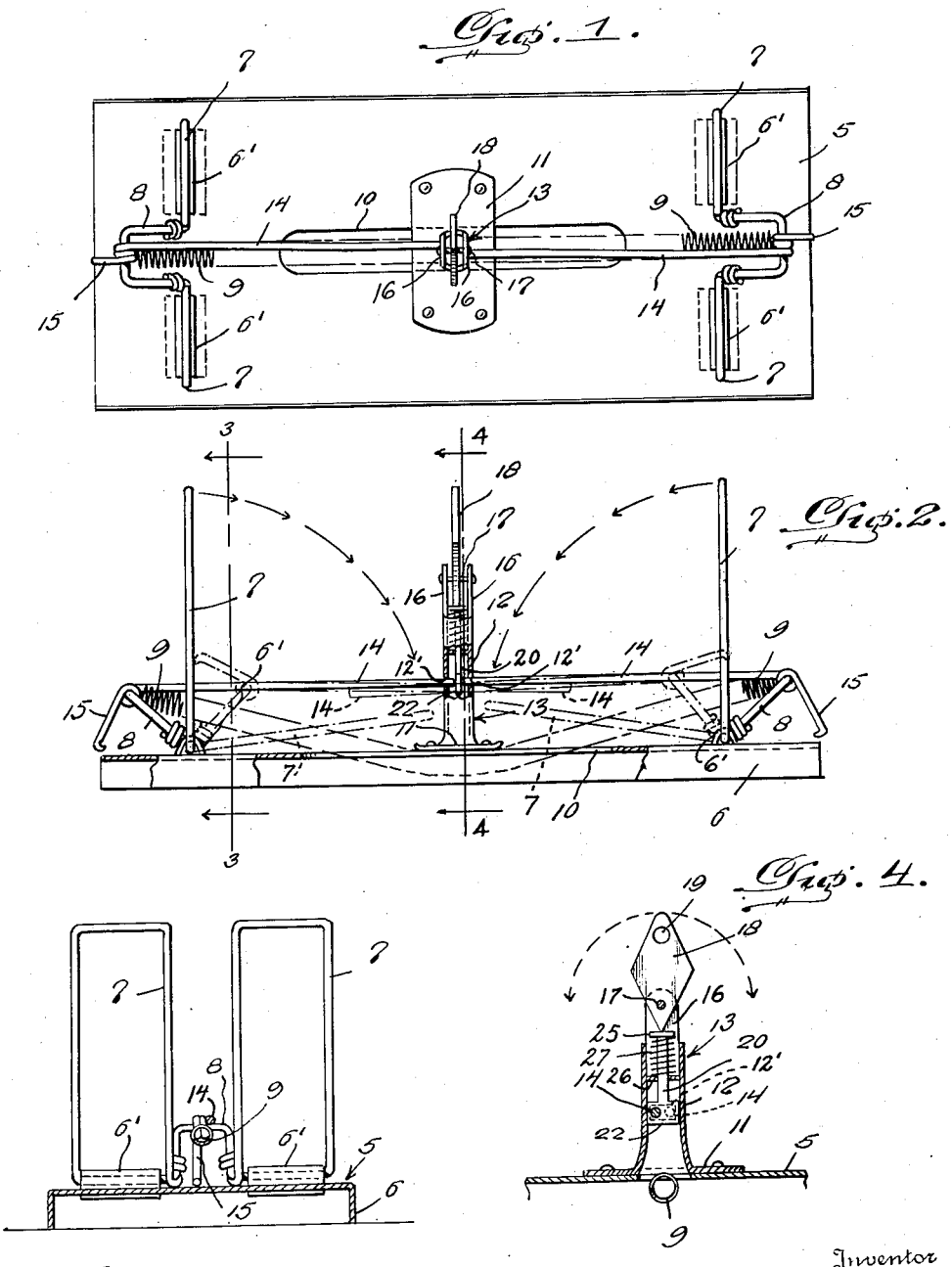

2,482,454

UNITED STATES PATENT OFFICE 2,482,454

TRAP

Walter C. Bailey, Kendall, Kans.

Application February 25, 1944, Serial No. 523,864

6 Claims. (Cl. 43—81.5)

This invention relates to traps for catching rats and other rodents as well as other small fur-bearing animals, and has for the primary object the provision of a trap which will be simple, durable and efficient and which includes pairs of spring influenced jaws cooperative with a rigid base for firmly gripping and holding an animal when trapped thereby.

Another object of this invention is the provision of a latch mechanism to which bait may be easily attached and which will be extremely sensitive to the action of an animal taking the bait and which will be easy to operate for the setting of the jaws.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a trap constructed in accordance with my invention.

Figure 2 is a side elevation, partly in section, illustrating the trap, the full lines indicating the trap in cocked position and the dash and dotted lines indicating the trap in released position.

Figure 3 is a transverse sectional view taken on the line 3—3 of Figure 2.

Figure 4 is a fragmentary transverse sectional view on the line 4—4 of Figure 2, illustrating the latch mechanism.

Referring in detail to the drawings, the numeral 5 indicates an elongated rigid base provided with depending flanges 6 on opposite longitudinal edges thereof for the support of the base on a surface. Pairs of bearing sleeves 6' are suitably secured on the base adjacent the ends thereof and rotatably support pairs of jaws 7, the jaws of each pair being integrally connected by crank shaped members 8. Each jaw is formed from stiff wire and is of substantially rectangular shape, as clearly shown in Figure 3, one cross end portion of the rectangular frame thus formed being hinged in the supporting sleeve 6'. The crank shaped members 8 are connected at the middle thereof each to the ends of a coil spring 9 which extends through a slot 10 provided in the top wall of the transverse base and under a base plate 11 of a post 12 forming a part of a latch mechanism 13. The action of the spring is to swing the pairs of jaws in the direction of each other and against the base 5 with considerable force so as to cooperate with the base in gripping and holding an animal. The movement of the jaws under the influence of the spring is indicated by the arrows in Figure 2.

Latch rods 14 are journaled and supported at their outer ends on the crank shaped members 8 and are adapted to have their meeting inner ends pass freely through aligned openings 12', 12', provided in the post 12 at opposite sides thereof. Formed on the journaled ends of the latch rods are extension hooks 15 which may be manually engaged with end edges of the base for sustaining the jaws temporarily in a substantially upright position against the action of the spring prior to the insertion of the latch rods into the openings 12', 12' of the post 12 thereof.

The upper end of the post 12 is bifurcated so as to form spaced ears 16 which carry a pin 17, said pin having the trigger plate 18 mounted for pivotal movement thereon. The trigger plate is apertured in its upper portion as at 19 for the accommodation of suitable bait therein. As shown in Figure 4, the trigger plate is of substantially diamond-shape and has its lower end in engagement with the upper face of the head 25 of the spring-influenced plunger 20 slidably mounted within the post 12. Disposed within the post 12 and fixedly secured thereto is a plate 26 provided with an aperture for the passage of the stem of the plunger 20 therethrough. Mounted in surrounding relation with the upper portion of the stem of the plunger 20 is a spring 27, the upper end of the spring bearing against the lower face of the head 25 of the plunger 20 and the lower end bearing against the upper face of the plate 26 and supported thereon. Depending from the lower end of the plunger 20 and carried thereby is the abutment member 22 against which are adapted to bear the ends of the offset latch rods 14 extending through the complemental aligned openings 12', 12' in the post 12. By reference to Figures 2 and 4 illustrating the trap in cocked position, it will be seen that the abutment member 22 is intermediate the aligned openings 12', 12' in the post 12, with each of the ends of the offset latch rods 14 in bearing contact with the face of said abutment member adjacent thereto. Thus, the abutment member when positioned intermediate the aligned openings 12', 12' in the post 12 prevents the latch rods 14 when inserted in said openings from passing entirely through the post 12, thereby causing the jaws 7 to be maintained in upright position under the influence of the spring 9.

An animal attempting to take the bait supported in the opening 19 of the trigger plate 18 will cause pivotal movement of the trigger plate, freeing or releasing the spring-influenced plunger 20 so that the abutment member 22 thereof moves upwardly under the action of the spring 27 out of engagement with the openings 12', 12' in the post 12, permitting the latch rods 14 to slide freely relative to each other and through aligned openings 12', 12' of the post 12 so that the jaws 7 may swing into engagement with the base 5 with considerable force under the action of the spring 9 to clamp the animal tightly against said base. It will be seen that the animal may take the bait from either side of the post 12, and thus will be in a position to be engaged by either pair of the jaws 7.

A trap of the kind shown in the drawings and described in detail heretofore will be durable, extremely simple and economical to construct, easy to set and will be positive in catching of an animal.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a trap, a rigid base, jaws hinged on said base for swinging movement in the direction of each other and the base, crank portions formed on the jaws, latch rods hinged to the crank portions and extending in the direction of each other, tension means connecting the crank portions, a post mounted on the base between said jaws and having openings to freely receive the latch rods, and a trigger means carried by said post to engage the adjacent ends of the rods to prevent movement thereof through the openings of the post for sustaining the jaws in set position at substantially right angles to the base.

2. In a trap, a rigid base, jaws hinged on said base for swinging movement in the direction of each other and the base, crank portions formed on the jaws, latch rods hinged to the crank portions and extending in the direction of each other, tension means connecting the crank portions, a post mounted on the base between said jaws and having openings to freely receive the latch rods, a spring influenced plunger carried by the post to engage adjacent ends of the latch rods to sustain the jaws in set position at substantially right angles to the base, and a bait plate pivotally connected to the post and engaging said plunger.

3. In a trap, a rigid base, jaws hinged on said base to swing in the direction of each other and cooperate with the base in gripping an animal, cranks on said jaws, said base having a slot, a post mounted on said base and straddling the slot, a coil spring passing through the slot under the post and having its ends connected to the cranks to urge the jaws in the direction of the base, latch rods pivoted to the cranks, said post having openings to freely and slidably receive the latch rods, a spring pressed plunger carried by the post to engage adjacent ends of the rods to sustain said rods from sliding through the post, and a bait carrying plate pivoted to the post to engage the spring pressed plunger.

4. In a trap, a rigid base, jaws hinged on said base to swing in the direction of each other and cooperate with the base in gripping an animal, cranks on said jaws, said base having a slot, a post mounted on said base and straddling the slot, a coil spring passing through the slot under the post and having its ends connected to the cranks to urge the jaws in the direction of the base, latch rods pivoted to the cranks, said post having openings to freely and slidably receive the latch rods, a spring pressed plunger carried by the post to engage adjacent ends of the rods to sustain said rods from sliding through the post, a bait carrying plate pivoted to the post to engage the spring pressed plunger, and hook shaped members formed on the pivoted ends of the latch rods to engage end edges of the base to sustain the jaws in set position while said latch rods are out of the openings and during a period of time when the plunger is being set to intercept the movement of said latch rods through the openings of the post.

5. In a trap, a rigid base, opposed pairs of jaws hinged on said base, each pair of the jaws being arranged in spaced and aligned relation to each other, tension means acting to urge the jaws of each pair inwardly and downwardly toward each other and into gripping relation with the base, latch rods in association with said jaws, a post mounted on said base between said jaws, and releasable trigger means carried by said post adapted to engage the adjacent ends of said rods to prevent movement of the latter relative to each other for sustaining the opposed pairs of jaws in set position substantially vertical and at right angles to the base.

6. In a trap, a rigid elongated base, opposed pairs of jaws hinged on the base adjacent the opposite ends thereof, each pair of the jaws being arranged in spaced and aligned relation to each other, tension means acting to urge the jaws of each pair inwardly and downwardly toward each other and into gripping relation with the base, the jaws of each pair being spaced apart and having a common crank element connecting the same whereby the jaws are movable together toward and away from each other, a post located medially on the base, a cooperative pair of rods each having its outer end pivotally attached to the crank element of one of said pairs of jaws and the inner end portions of said rods being arranged and adapted to pass each other and being slidably supported on said post, and trigger means comprising a vertically movable latch element having a portion to be interposed between the inner ends of said rods in the retracted position of the same and whereby, upon release of said latch element from between the ends of said rods, the rods are movable past each other in their supported relation on the post, under the force of the tension means in urging the opposed pairs of jaws toward each other and downwardly in gripping relation with the base of the trap.

WALTER C. BAILEY.

REFERENCES CITED

The following references are of record in the file of this patent:

UNITED STATES PATENTS

| Number | Name | Date |
|---|---|---|
| 579,026 | Trumble | Mar. 16, 1897 |
| 891,880 | Timby | June 30, 1908 |
| 928,779 | Miller | July 20, 1909 |
| 1,211,134 | Gill | Jan. 2, 1917 |
| 1,299,086 | Wing | Apr. 1, 1919 |
| 1,389,626 | Chute | Sept. 6, 1921 |
| 1,452,087 | Mark et al. | Apr. 17, 1923 |
| 1,455,106 | Butler | May 15, 1923 |
| 1,494,918 | Kleinpeter | May 20, 1924 |
| 1,530,918 | Stilson et al. | Mar. 24, 1925 |
| 1,558,015 | Jones | Oct. 20, 1925 |

FOREIGN PATENTS

| Number | Country | Date |
|---|---|---|
| 7,711 | Great Britain | 1899 |